Oct. 8, 1940.  W. PISTOR ET AL  2,216,960
SYSTEM FOR MAKING AND PROJECTING STEREO FILMS
Filed June 15, 1938
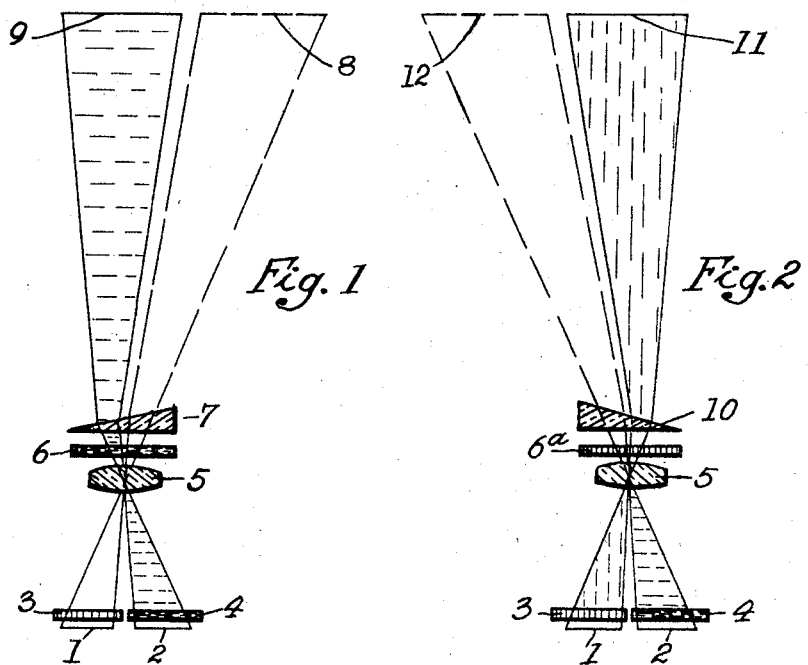
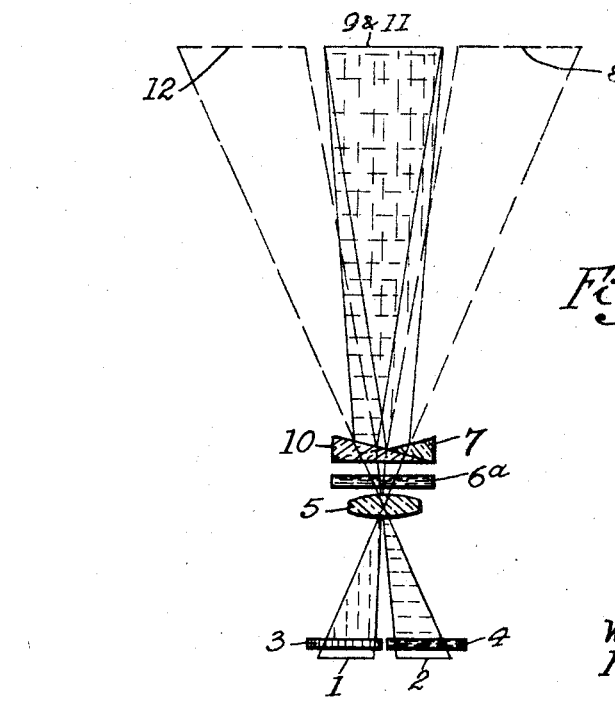
Inventors
Werner Pistor
Fritz Köber
by B. Singer & F. Stern
Attorneys Patented Oct. 8, 1940

2,216,960

UNITED STATES PATENT OFFICE 2,216,960

SYSTEM FOR MAKING AND PROJECTING STEREO FILMS

Werner Pistor, Dresden-Loschwitz, and Fritz Köber, Dresden, Germany, assignors to Zeiss Ikon Aktiengesellschaft, Dresden, Germany Application June 15, 1938, Serial No. 213,918
In Germany April 14, 1937

5 Claims. (Cl. 88—16.6)

The invention relates to stereo photography and in particular is directed to a system of making and projecting stereo film.

When projecting stereo films according to the double picture method upon a screen, it is necessary that the two pictures are brought into registration on the screen. This can be accomplished by a single projection objective in front of which are arranged approximately in a horizontal position two optical wedges. These optical wedges subdivide the projection objective into an upper objective half and into a lower objective half, and have the effect, that the light rays passing through the upper half of the objective are deflected horizontally in one direction, while the light rays passing through the lower half of the objective are deflected horizontally in the other direction. The result is, that a left hand picture and a right hand picture are brought into coincidence in the center of the screen. However, there will be produced also two additional lateral pictures which have to be brought to disappearance or have to be screened-off, as otherwise they would disturb considerably the stereoscopic effect during the observation.

Until now it was customary to remove the additional pictures by means of a slot-shaped diaphragm positioned at a certain distance in front of the projection objective. This diaphragm screens off the two lateral additional pictures. A disadvantage of such a diaphragm is, however, that the same acts as a mask only and that it is difficult to mount the same in motion picture theaters in front of the projection booth.

The principal object of the present invention is to eliminate the employment of such mechanical diaphragms by inserting in both paths of light which project the two pictures onto the screen two polarizers, one adjacent the pictures and one in front of the projection objective, that is to say, between the objective and the optical wedges. The two polarizers in each path of light have their polarizing planes at a right angle with respect to each other, so that the additional lateral image resulting from the picture to be projected by the other path of light is extinguished by these crossed polarizers.

Another object of the invention is to employ in a similar manner two crossed polarizing filters in each of the two separate paths of light employed in a stereo photographic camera for producing stereo pictures and films respectively.

Other objects of the invention will be apparent from the following specification with reference to the accompanying drawing.

In the drawing:

Fig. 1 illustrates diagrammatically the passage of the light rays through the upper half of a projection objective of the present invention, Fig. 2 illustrates diagrammatically the passage of the light rays through the lower half of the projection objective, and Fig. 3 illustrates diagrammatically both light rays systems of Figs. 1 and 2 combined.

Referring to the Figs. 1 to 3, the left hand picture of the stereo film is designated with 1 and the right hand picture with 2. The polarizers 3 and 4 are positioned in front of the pictures 1 and 2 respectively. The polarizer 3 polarizes light in a vertical plane, as is indicated by the vertical dash lines, and the polarizer 4 polarizes light in a horizontal plane, as is indicated by the horizontal dashed lines.

According to Fig. 1, the polarized light rays after having passed through the upper half of the objective 5 pass through another polarizer 6 and an optical wedge 7, both arranged in front of the upper half of the objective 5. The polarizing plane of the last mentioned polarizer 6 lies horizontal, which has the result that the picture 1, which without the polarizer 6 would be deflected by the wedge 7 to the position 8 on the screen, is extinguished, because the polarizing plane of the polarizer 6 is at a right angle with respect to the polarizing plane of the polarizer 3. The picture 2, however, is projected unimpeded through the polarizer 6 and is deflected by the wedge 7 to the position 9 on the screen.

Fig. 2 illustrates the passage of the light rays through the lower half of the objective 5. Another polarizer $6^a$ permitting the passage of light vibrating in a vertical plane and an optical wedge 10 are arranged in front of the lower half of the objective 5. The result is that the left hand picture 1 is projected unimpeded through the last mentioned polarizer $6^a$ and is deflected by the wedge 10 to the position 11 on the screen, while the right hand picture 2, which without the polarizer $6^a$ would appear at the position 12 on the screen, is extinguished.

Fig. 3 illustrates the combined effect of both optical systems illustrated individually in the Figs. 1 and 2. It will be noted that the two projections 9 and 11 of the pictures 1 and 2 respectively, are in coincidence, as indicated by the series of dashed lines crossing each other, while the two additional pictures 8 and 12 do not appear at all, because they are extinguished in a manner just explained.

It is advisable to arrange the first mentioned polarizers 3 and 4 behind the stereo film with respect to the location of the source of illumination, so that the polarizing filters 3 and 4 are not damaged or destroyed by the heat radiated from said source.

The above described system for projecting stereo films may also be employed with suitable adaptations for producing stereo films or pictures. It is merely necessary to insert in the two bundles of light, namely in front of the photographic objective and in front of each of the two picture frames suitable crossed polarizers.

What we claim is:

1. In a system of projecting stereo pictures according to the double picture method, optical means for projecting two separate pictures simultaneously in coincidence upon a screen, said optical means including an objective and optical wedges mounted in front of said objective, one for each picture, each of said optical wedges covering one half of said objective, said optical means producing from each of said pictures two laterally displaced images, one image of each of said pictures being deflected by said optical wedges so as to appear on the screen in coincidence, two polarizing filters positioned rearwardly of said objective near said pictures in a single plane, one for each picture, said polarizing filters have their polarizing planes at a right angle with respect to each other, and two other polarizing filters, one for each of said optical wedges, each of said last named polarizing filters having its polarizing plane at a right angle with respect to the polarizing plane of the polarizing filter which is positioned rearwardly of said objective and is associated with that picture whose two images are transmissible by the other optical wedge, whereby only the two images coinciding on the screen are transmitted, the other two images being obturated.

2. In a system of projecting stereo pictures according to the double picture method, optical means for projecting two separate pictures simultaneously in coincidence upon a screen, said optical means including an objective and optical wedges mounted in front of said objective, one for each picture, each of said optical wedges covering one half of said objective, said optical means producing from each of said pictures two laterally displaced images, one image of each of said pictures being deflected by said optical wedges so as to appear in coincidence upon the screen, two polarizing filters positioned in front of said pictures in a single plane, one for each picture, said polarizing filters have their polarizing planes at a right angle with respect to each other, and two other polarizing filters, one for each of said optical wedges and positioned between said objective and said respective optical wedge, each of said last named polarizing filters having its polarizing plane at a right angle with respect to the polarizing plane of the polarizing filters which is positioned in front of that picture whose two images are transmissible by the other optical wedge, whereby only the two images coinciding on the screen are transmitted, the other two images being obturated.

3. In a system of projecting stereo pictures according to the double picture method, optical means for projecting two separate pictures simultaneously upon a screen, said optical means including an objective and optical wedges mounted in front of said objective, one for each picture, each of said optical wedges covering one half of said objective, said optical means producing from each of said pictures two laterally displaced images, one image of each of said pictures being deflected by said optical wedges in coincidence upon the screen, one polarizing filter for each of said pictures and positioned adjacent said pictures in the path of light illuminating the latter, said polarizing filters have their polarizing planes at a right angle with respect to each other, and two other polarizing filters, one for each of said optical wedges and positioned between said objective and said respective optical wedge, each of said last named polarizing filters having its polarizing plane at a right angle with respect to the polarizing plane of the polarizing filter which is positioned adjacent and is associated with that picture whose two images are transmissible by the other optical wedge, whereby only the two images coinciding on the screen are transmitted, the other two images being obturated.

4. In a system of producing stereo pictures, optical means for producing on a light sensitive layer two separate pictures simultaneously of an object photographed, said optical means including a photographic objective, two ray deflecting means mounted in front of said objective, one for each picture to be produced, said optical means producing from the object photographed two laterally displaced images in the focal plane of said photographic objective, a portion of each of said images being in stereoscopic relation to each other, two polarizing filters positioned in front of each section of the light sensitive layer on which said stereoscopic pictures are produced, said polarizing filters have their polarizing planes at a right angle with respect to each other, and two other polarizing filters, one for each of said two ray deflecting means, each of said last named polarizing filters having its polarizing plane at a right angle with respect to the polarizing plane of the polarizing filter which is positioned in front of that section of the light sensitive layer which receives an image through the other ray deflecting means, whereby only the two image portions which are in stereoscopic relation are transmitted to the light sensitive layer, the other two image portions being obturated.

5. In a system of producing stereo pictures, optical means for producing on a light sensitive layer two separate pictures simultaneously from an object to be photographed, said optical means including a photographic objective, two ray deflecting means mounted in front of said objective, one for each picture to be produced, said optical means producing from the object photographed two laterally displaced images in the focal plane of said photographic objective, a portion of each of said images being in stereoscopic relation to each other, two polarizing filters positioned in front of each section of the light sensitive layer on which said stereoscopic pictures are produced, said polarizing filters have their polarizing planes at a right angle with respect to each other, and two other polarizing filters, one for each of said two ray deflecting means and positioned between said photographic objective and said respective ray deflecting means, each of said last named polarizing filters having its polarizing plane at a right angle with respect to the polarizing plane of the polarizing filter which is positioned in front of that section of the light sensitive layer which receives an image through the other ray deflecting means, whereby only the two image portions which are in stereoscopic relation are transmitted to the light sensitive layer, the other two image portions being obturated.

WERNER PISTOR.
FRITZ KÖBER.